United States Patent [19]
Croyle et al.

[11] Patent Number: 5,530,652
[45] Date of Patent: Jun. 25, 1996

[54] AUTOMATIC GARMENT INSPECTION AND MEASUREMENT SYSTEM

[75] Inventors: Gene F. Croyle, Plano; Wei-Chin Lin, Richardson, both of Tex.

[73] Assignee: Levi Strauss & Co., San Francisco, Calif.

[21] Appl. No.: 105,853

[22] Filed: Aug. 11, 1993

[51] Int. Cl.⁶ .......................... G06F 19/00; G01B 11/24
[52] U.S. Cl. .................. 364/470; 356/376; 356/394; 382/111
[58] Field of Search ................... 364/468, 469, 364/470; 356/376, 394, 392, 243; 358/96, 101; 395/118, 119, 137; 382/8

[56] References Cited

U.S. PATENT DOCUMENTS

| | | | |
|---|---|---|---|
| 4,019,036 | 4/1977 | Hiramatsu et al. | 364/470 |
| 4,056,716 | 11/1977 | Baxter et al. | 382/16 |
| 4,111,557 | 9/1978 | Rottenkolber et al. | 356/168 |
| 4,149,246 | 4/1979 | Goldman | 364/200 |
| 4,204,193 | 5/1980 | Schroeder | 382/45 |
| 4,261,012 | 4/1981 | Maloomian | 358/93 |
| 4,406,544 | 9/1983 | Takada et al. | 356/376 |
| 4,519,037 | 5/1985 | Brodeur et al. | 364/400 |
| 4,539,585 | 9/1985 | Spackova et al. | 358/93 |
| 4,546,434 | 10/1985 | Gioello | 364/470 |
| 4,556,985 | 12/1985 | Hongo | 382/30 |
| 4,598,376 | 7/1986 | Burton et al. | 364/470 |
| 4,635,367 | 1/9187 | Vigede | 33/15 |
| 4,705,401 | 11/1987 | Addleman et al. | 356/376 |
| 4,731,743 | 3/1988 | Blancato | 364/521 |
| 4,758,960 | 7/1988 | Jung | 364/470 |
| 4,807,143 | 2/1989 | Matsuura | 364/468 |
| 4,821,200 | 4/1989 | Öberg | 364/474.24 |
| 4,842,411 | 6/1989 | Wood | 356/376 |
| 4,876,758 | 10/1989 | Rolloff et al. | 12/142 |
| 4,885,844 | 12/1989 | Chun | 33/15 |
| 4,900,144 | 2/1990 | Kobayashi | 351/206 |
| 4,905,159 | 2/1990 | Loriot | 364/470 |
| 4,916,624 | 4/1990 | Collins et al. | 364/470 |
| 4,926,344 | 5/1990 | Collins et al. | 364/470 |
| 4,949,286 | 8/1990 | Ohba | 364/521 |
| 5,016,183 | 5/1991 | Shyong | 364/470 |
| 5,163,006 | 11/1992 | Deziel | 364/468 |
| 5,163,007 | 11/1992 | Slilaty | 364/470 |

*Primary Examiner*—Paul P. Gordon
*Attorney, Agent, or Firm*—Medlen & Carroll

[57] ABSTRACT

An automatic garment inspection and measurement system can create a two-dimensional or three-dimensional electronic representation of an object. This electronic representation can then be combined with other electronic representations to create a database of measurements from which standard patterns can be generated for use in manufacturing garments. The electronic representation can also be used to compare the manufactured object it represents to an ideal representation in order to determine if the object's measurements are within a predetermined tolerance of the ideal representation. A machine vision system is used to capture an image of the object and convert that image into a digital representation which can then be added to a database to be used to compile an ideal pattern or can be compared to an already existing ideal image to determine if the object is the correct size.

21 Claims, 6 Drawing Sheets

5,530,652

AUTOMATIC GARMENT INSPECTION AND MEASUREMENT SYSTEM

FIELD OF THE INVENTION

The present invention relates to the field of automatic garment inspection and generation of garments matching specified sizes. More particularly, the present invention is directed to a system which can automatically measure physical dimensions of an object without touching that object, digitize and store data representative of the physical dimensions of the object and compare that data to an ideal set of data.

BACKGROUND OF THE INVENTION

There are many different methods for measuring physical dimensions of objects such as the human body. One of the most common is the manual method whereby the measurer takes certain measurements of a person utilizing a device such as a tape measure or the like. This type of measurement is time consuming, can be uncomfortable for the person being measured and may not yield totally accurate results. This discomfort to the person being measured can be from being touched by a relative stranger.

Other mechanical methods have also been used to measure the human body. One such method is the sliding gauge method which uses a multiplicity of parallel sliding bars each arranged perpendicular to a reference plane. These bars are brought into contact with the body being measured at their forward ends and the distances of the opposite ends from the reference plane are measured and analyzed with the use of a three-dimensional orthogonal coordinate system to obtain the measurements of the human body. This method is not desirable or comfortable because it requires that the parallel sliding bars come into contact with the person being measured.

Once a garment or similar object has been manufactured, similar mechanical methods must be used to inspect and measure the garment to insure that it is a desired size. In an automated factory, this type of mechanical inspection and measurement can cause undue delay and slow down the manufacturing process.

It is a principal feature of the present invention to mechanically and automatically measure a person without touching that person and digitize and store the information necessary to create a database that can be used to generate an ideal pattern for clothing for that person. A plurality of similarly sized persons can be measured using the method and apparatus of the present invention to generate a generic ideal clothing pattern for a class of persons, e.g. 6'0" tall, weighing 180 pounds, having a 34" waist and a 35" inseam. It is a further object of the present invention to automatically inspect garments which have been previously manufactured to make sure that their measurements are the same as an ideal pattern within a predetermined allowable tolerance.

SUMMARY OF THE INVENTION

An automatic garment inspection and measurement system can create a two-dimensional or three-dimensional electronic representation of an object. This electronic representation can then be combined with other electronic representations to create a database of measurements from which standard patterns can be generated for use in manufacturing garments. The electronic representation can also be used to compare the manufactured object it represents to an ideal representation in order to determine if the object's measurements are within a predetermined tolerance of the ideal representation. A machine vision system is used to capture an image of the object and convert that image into a digital representation which can then be added to a database to be used to compile an ideal pattern or can be compared to an already existing ideal image or the manufacturing specifications of the object to determine if the object is the correct size.

BRIEF DESCRIPTION OF THE DRAWINGS

FIG. 6 illustrates the two-dimensional automatic inspection and measurement system being used with a conveyor system.

DETAILED DESCRIPTION OF THE PREFERRED EMBODIMENT

The automatic garment inspection and measurement system of the present invention can be used to inspect and measure garments in both a three-dimensional system and a two-dimensional system. The three-dimensional measurement system can be used to both measure a group of persons for a creation of a database and to inspect an object for conformity with pre-existing specified standards. The three-dimensional measurement system can also be used to generate a physical measurement set for an individual customer. The two-dimensional measurement system is used to inspect an object for conformity with specified standards.

Three-Dimensional Measurement System

Figure 1A:
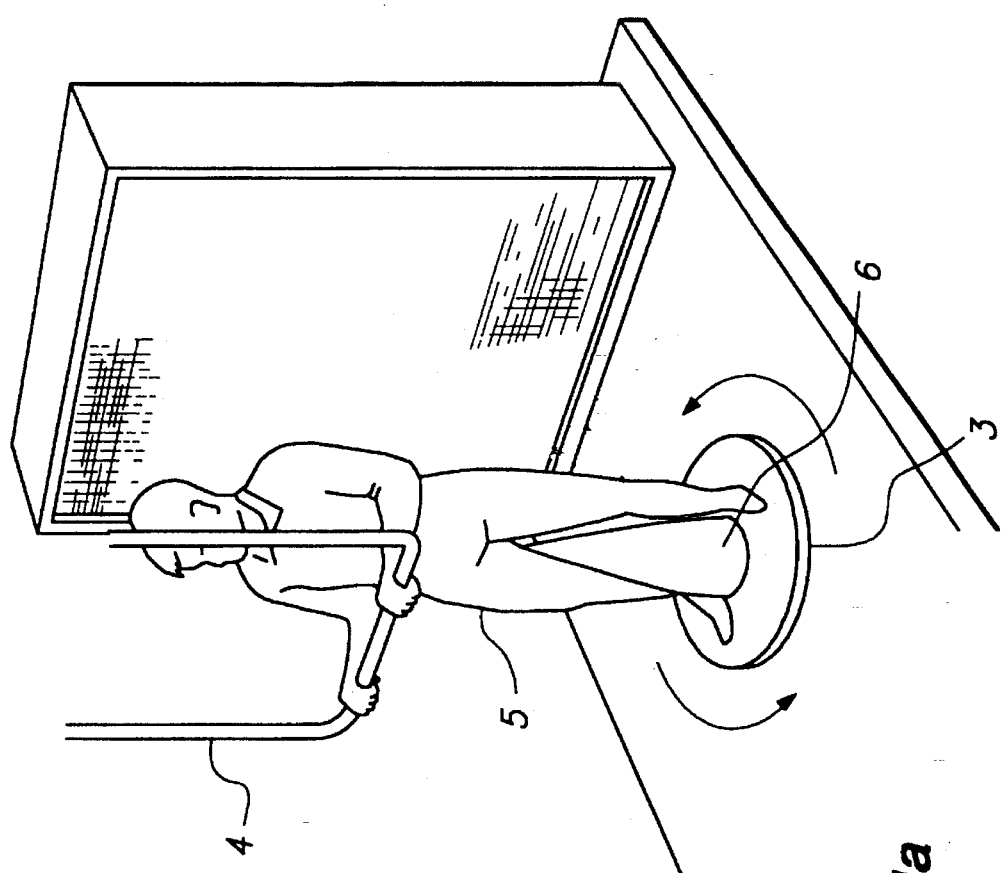
FIG. 1a illustrate the three-dimensional automatic inspection and measurement system completing a measurement of a person.

The three-dimensional measurement system of the present invention can be used to measure a person as illustrated in FIG. 1a. A machine vision system 1 is electronically coupled to a computer 2, the coupling means comprising a cable 52, and placed in front of a rotating platform 3. A person 5 stands on the rotating platform 3 while measurements are taken. The rotating platform 3 then rotates slowly and the machine vision system 1 captures images of the person 5 at different predetermined angles of rotation, e.g. at every ten or twenty degrees.

Figure 1B:
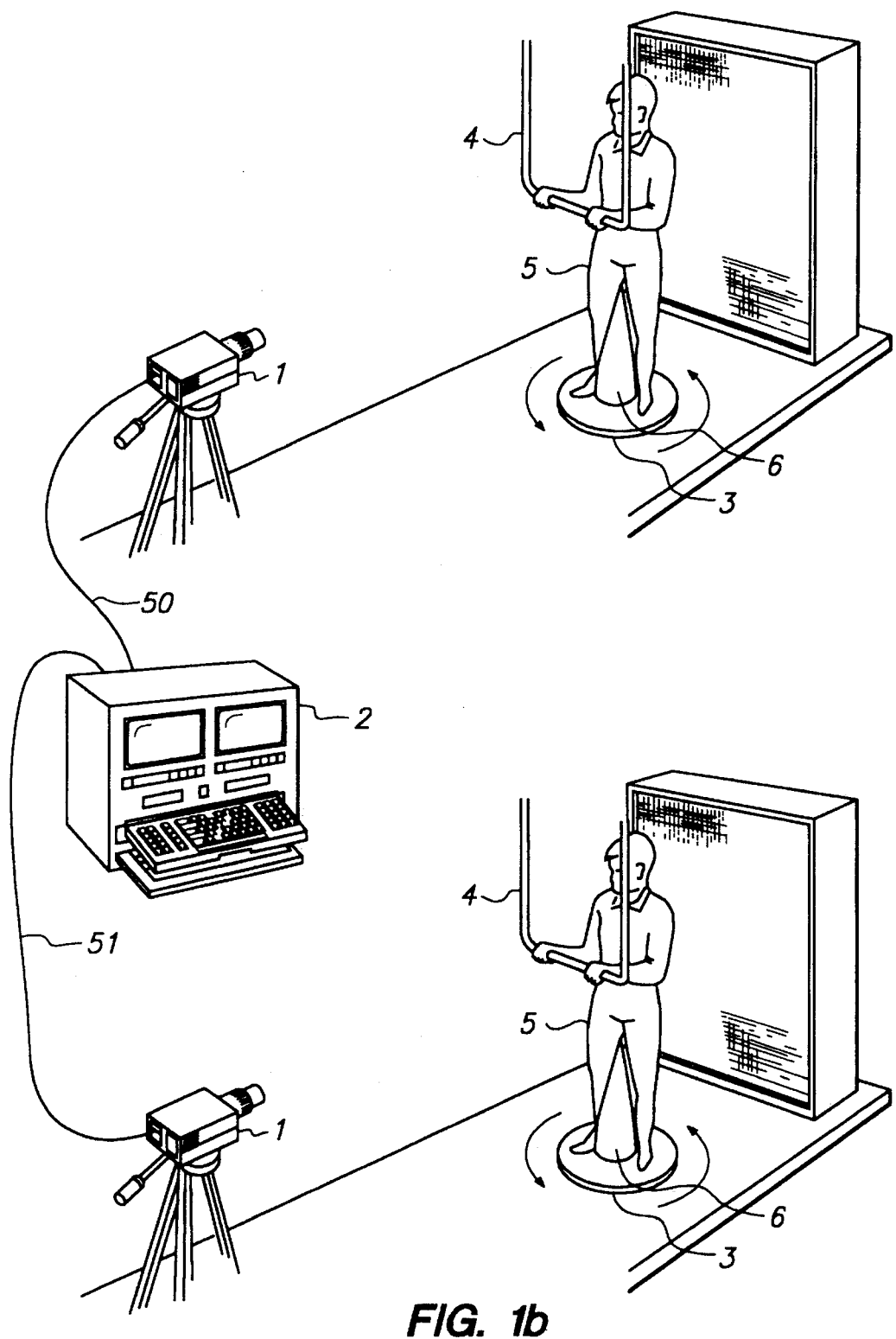
FIG. 1b illustrates a plurality of inspection stations coupled to a single computer.
Figure 2:
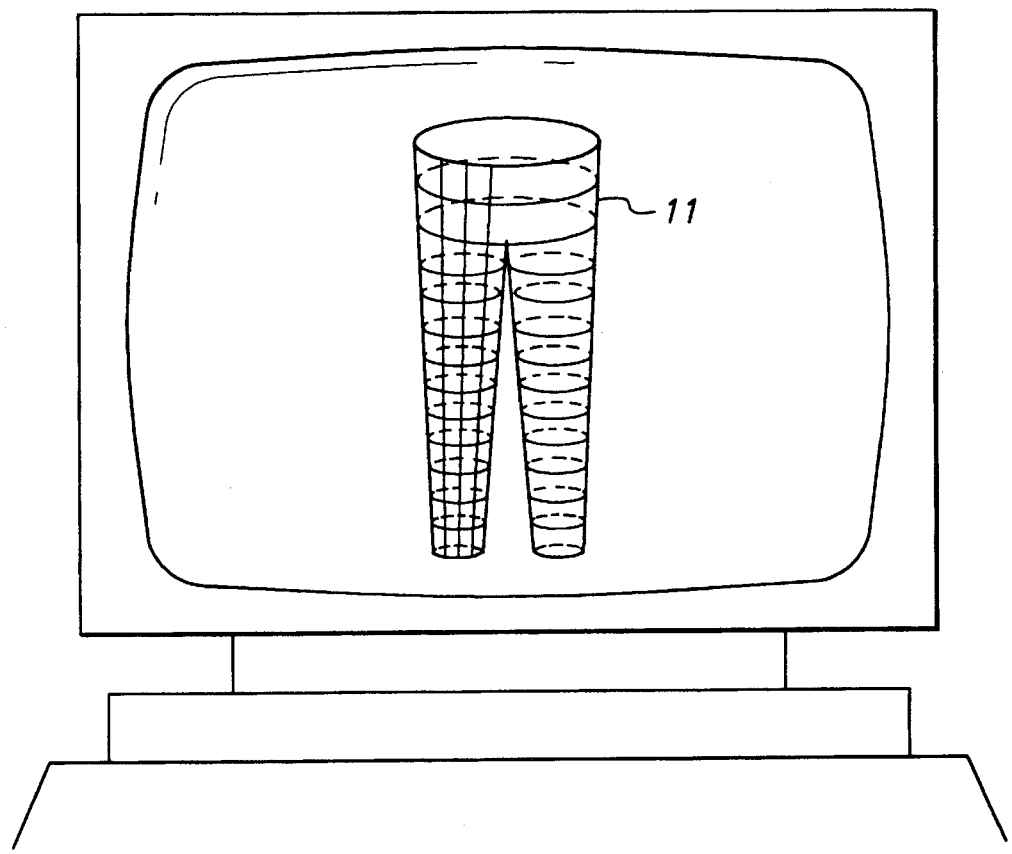
FIG. 2 illustrates a computerized wire-frame representation of a person's lower body measurements.

The machine vision system 1 in the preferred embodiment comprises an image capturing charge coupled device (CCD) array camera, an analog to digital converter that translates the analog image signal into a digital image signal and an image processor that analyzes the digital image. The image processor is coupled to send the analyzed data to the system computer 2 which processes the data and forms a computerized wire frame representation of the person's body as illustrated in FIG. 2. The wire frame representation is a collection of line segments arranged as an image on a computer screen, paper or other two-dimensional display device to simulate a three-dimensional object such wire frame representations are common in computer aided design programs for three-dimensional objects. A single system computer 2 can be multiplexed to sequentially control multiple inspection stations and machine vision systems 1 as illustrated in FIG. 1b. The machine vision systems 1 coupled to the computer 2 by cables 50 and 51. The machine vision system 1 can also be comprised of any similar video camera or laser imaging system.

The three-dimensional measurement system of the present invention as illustrated in FIG. 1a can be used to create an ideal pattern from measurements of a group of people in the same size range. For example, computerized wire-frame representations 11 can be created for a group of any number of persons who wear the same size pants, one at a time, to create an idealized generic database for that size range. The databases of the computerized wire-frame representations 11 can then be mathematically compiled by the system computer 2 to form an ideal pattern which can be used to manufacture a pair of pants which will better fit the group of people as a whole.

To obtain the computerized wire-frame representations 11 from the group of people, and create the database for the size range, each person will be measured one at a time. Each person will either wear a tight-fitting suit such as leotards, long johns, a wet suit or appear without clothing. Each person will then stand on the rotating platform 3, holding on to the chest level bar 4 with a partition 6 to uniformly space their legs. The rotating platform 3 is then rotated through a full 360° turn with the machine vision system 1 capturing an image at multiple predetermined rotation angles throughout the turn, as discussed above. The chest level bar 4 is used to keep the person's arms out of the way so that an accurate image of the person's legs can be captured and also to give the person balance and stability throughout the turn. The partition 6 is used to separate the person's legs for the purpose of capturing a useful image. If measurements of the person's whole body or a different part of the person's body are desired for measurement of a piece of clothing other than a pair of pants, the person can be positioned without the chest level bar 4 or the partition 6 or by grasping hand grips positioned for the person to have their arms fully extended away from their body.

When the rotating platform 3 has completed a full rotation, the computer system 2 will process the image data received from the machine vision system 1 and create a database compilation of the computerized wire-frame representation 11 of the person. The data representing this computerized wire-frame representation is then saved in the computer memory as part of the database for the particular size range. After all of the persons in the group are scanned and the data representing each person is added to the database, the data for the group is compiled by the computer and normalized into an ideal pattern that will most nearly accommodate every member of the group. This ideal pattern will then be used to manufacture pants of that size. Naturally, a similar process can be used to manufacture shirts, socks or any other article of clothing.

Figure 3:
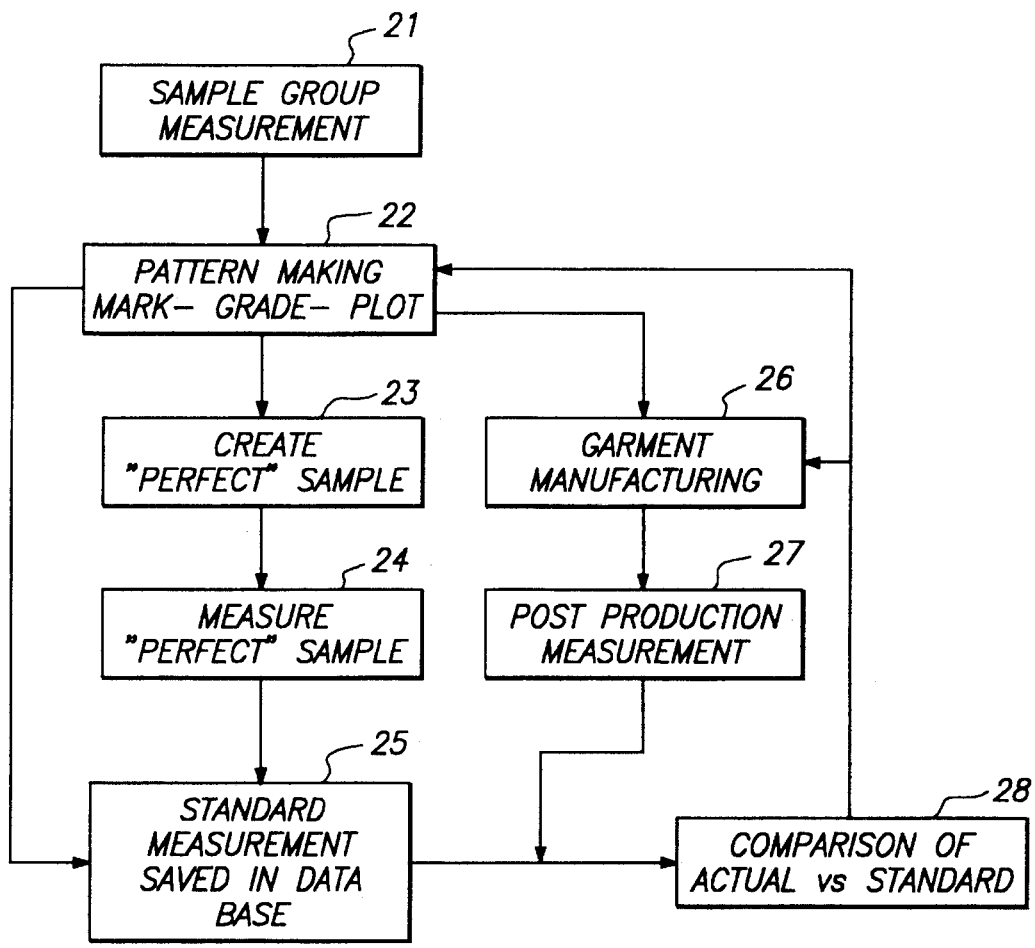
FIG. 3 illustrates a flow diagram representing the various stages of the present invention.

The above process is illustrated in FIG. 3 in the blocks 21 through 25. The process begins with the block 21 where the measurements of the sample group are taken. In the block 22 an ideal pattern is made that will most nearly accommodate every member of the sample group. A sample piece of clothing is created using the ideal pattern in the block 23. In the block 24, the sample created in the block 23 is measured and inspected to insure that it matches the specified ideal pattern. If the sample created in the block 23 does match the specified pattern, then the standard measurement and pattern created in the blocks 21 and 22 is saved in the block 25.

The same equipment and a similar process can also be used to inspect a manufactured piece of clothing to insure that its dimensions are correct. This process is illustrated in the blocks 26 through 28 of FIG. 3 and will be described more fully below in the context of the two-dimensional measurement system.

Figure 4:
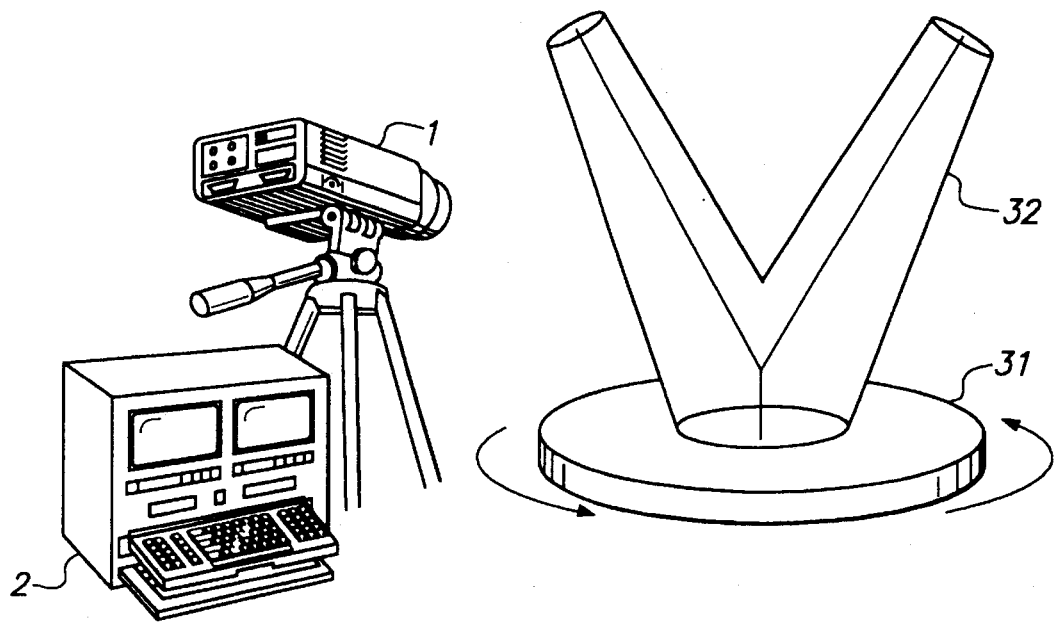
FIG. 4 illustrates the three-dimensional automatic inspection and measurement system completing a measurement of a pair of pants that have been inflated by compressed air.

FIG. 4 illustrates how the three-dimensional measurement system of the present invention is used to inspect a previously manufactured pair of pants. The rotating platform 31 is adapted so that the pair of pants 32 can be turned upside down and affixed to the platform with an air outlet inside the pants. The waistband of the pants is slipped over a garment mount attached to the rotating platform 31 with the button and fly of the pants 32 open. The button and fly of the pants 32 are then closed, affixing the pants to the rotating platform 31. Compressed air is then used to inflate and fully expand the pair of pants 32. The rotating platform 31 is then rotated through a full 360° turn with the machine vision system 1 capturing an image of the inflated garment at predetermined points throughout the rotation, e.g. at every ten or twenty degrees.

Figure 5:
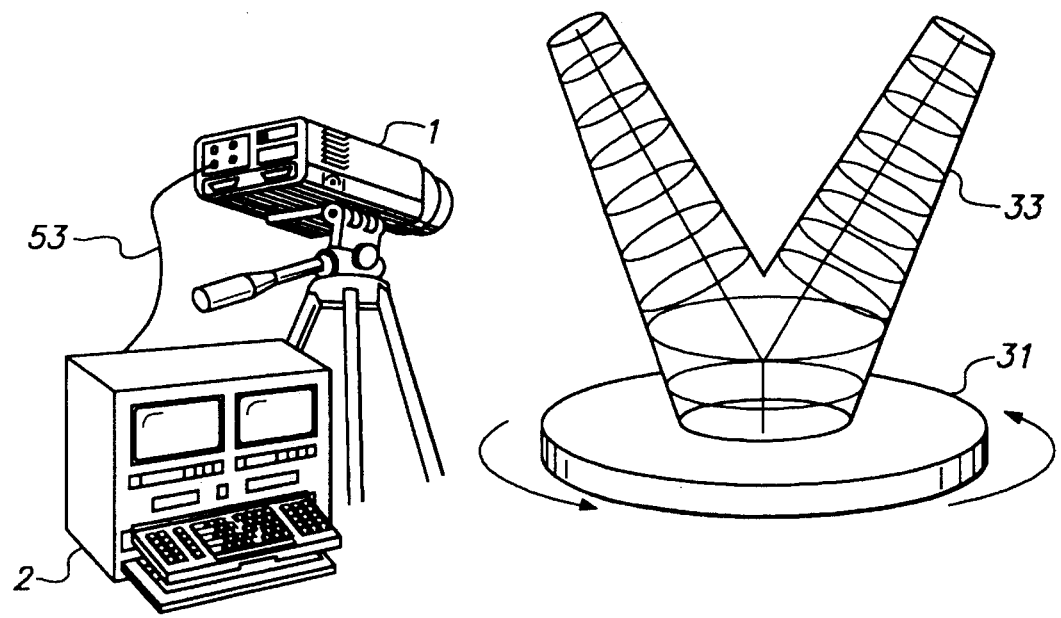
FIG. 5 illustrates a computerized wire-frame representation of a pair of pants that have been blown up by compressed air.

When the fixture rotation is complete, the system computer 2 will process the image data received from the machine vision system 1 coupled to it by cable 53, and form a computerized wire-frame representation of the pair of pants as illustrated in FIG. 5. The data representing this computerized wire-frame representation 33 is then compared to the ideal pattern that is stored in the system computer 2. The system computer 2 then determines if the pair of pants 32 on the rotating platform 31 matches the ideal pattern or is close enough to be within an allowable tolerance or deviation from that ideal pattern. The system computer 2 then will issue a signal to alert the operator that the pants comply with the size specifications or that the pair of pants are irregular.

The three-dimensional system of the present invention as described above can also be used to generate data on a single person. By capturing the images of the person throughout the full 360° turn, the measurements for that person can be determined and analyzed. These individual measurements can then be used to either generate tailor-made clothing for the individual or to determine which size of garments will best fit that person.

The three-dimensional system of the present invention can also be used in a retail store or outlet as a service to a customer. The customer can come in, put on the tight-fitting suit and stand on the rotating platform 3 as described above. When the rotating platform 3 has rotated through the full 360° turn, the computer system 2 will process the image data received from the machine vision system 1 and create a computerized wire-frame representation 11 of the person. The data representing this computerized wire-frame representation 11 of the customer will be saved in the system computer 2 for that customer. The wire-frame image can then at any subsequent time be used to generate individual patterns for this customer that can be used to create tailor-made pieces of clothing. This data can also be used in the store or outlet to determine the best size of a particular piece of clothing for this customer.

The individual patterns generated can be coupled to an automatic fabric cutting machine of a type well known for generating cut fabric workpieces. Those pieces can be hand sewn or transferred to an automatic sewing machine to provide the customer an ideal garment. In a fully automated installation a customer could enter, specify a style, color, fabric and leave the store with a personally manufactured garment.

In an alternate embodiment of the present invention, the person stands on a platform and the image capturing device circles around the person, capturing images of the person at different predetermined angles of rotation. In another embodiment of the present invention, n number of image capturing devices are used, with each camera positioned at a different point around the platform so that the person or the cameras will only have to be rotated through 1/n turns to allow the system computer to compile a full image. In another embodiment multiple image capturing devices are set up at predetermined vantage points around the platform and controlled by the system computer so that neither the platform nor the devices have to be rotated. The present invention can also work by having the image capturing devices and the platform rotate at the same time relative to each other.

Figure 1C:
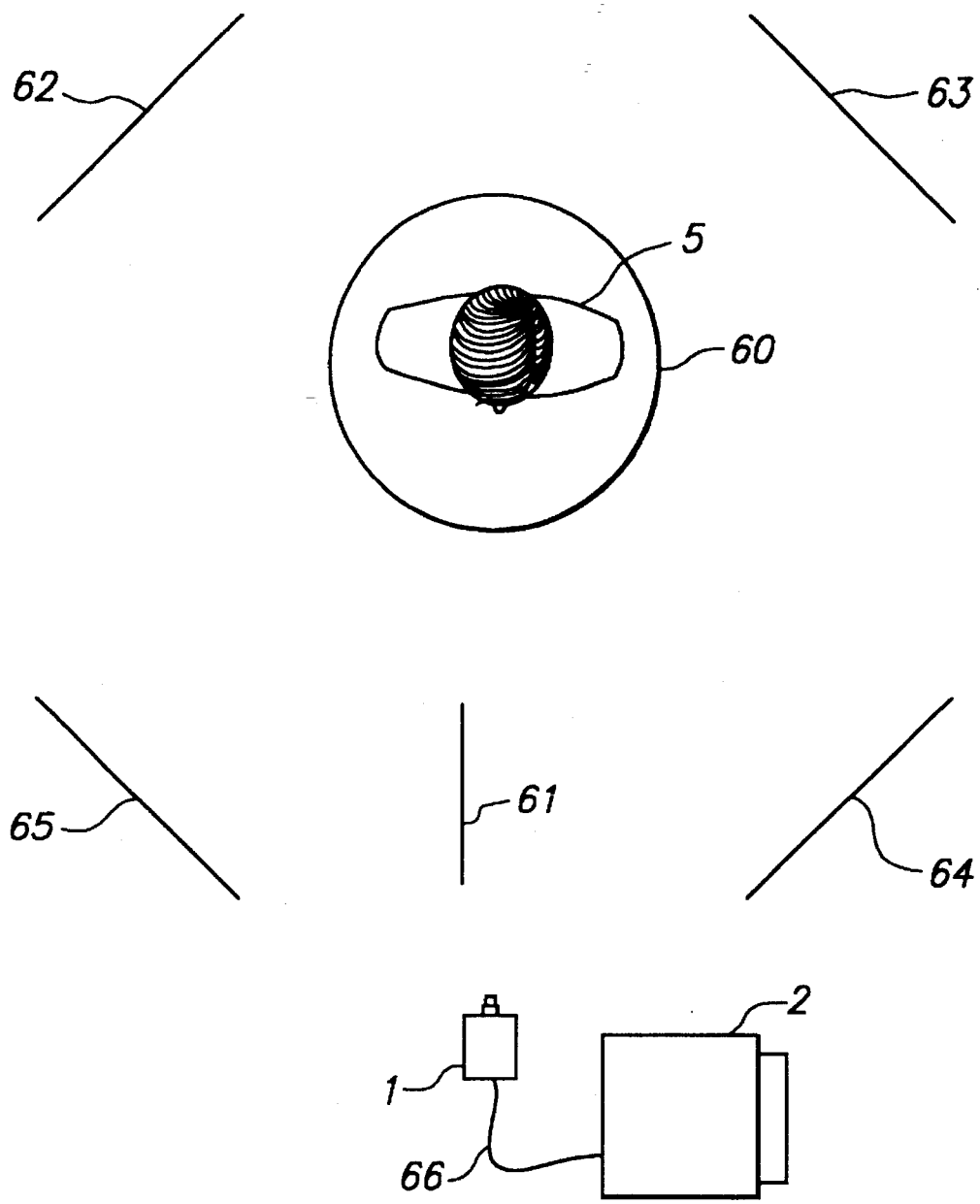
FIG. 1c illustrates an embodiment utilizing a plurality of mirrors.

In still a further embodiment of the invention, as illustrated in FIG. 1c, a single image capturing device 1 coupled to a system computer 2 via cable 66 and a plurality of mirrors 62–65 can be used, each mirror positioned at a different angle relative to the axis of rotation, with a single mirror 61 used with the camera. The single mirror 61 rotated to allow the camera to capture an image reflected from each of the plurality of mirrors 62–65 in turn. This embodiment has the advantage of not requiring the platform 60 to rotate and only using a single camera 1.

Two-Dimensional Measurement System

The preferred embodiment of a two-dimensional measurement system is illustrated in FIG. 6. The inspection station 41 is connected to an entry conveyor 44 on one side which delivers the pairs of pants to the inspection station and the inspection station is also connected to an exit conveyor 45 on the opposite side which carries the acceptable pairs of pants away from the inspection station 41. Naturally, the pants have been flattened in a predetermined manner. The machine vision system 42 is suspended above the inspection station 41 and is coupled to the system computer as in the three-dimensional measurement system. The reject bin 46 is placed next to the inspection station 41 so that any irregular pairs of pants which do not comply with the ideal pattern plus an allowable tolerance or deviation can be discarded.

The operation of the two-dimensional measurement system of the present invention is very similar to the operation of the previously described three-dimensional measurement system. The entry conveyor 44 brings the garments 43 up to the inspection station 41 one at a time. The machine vision system 42 then captures an image of the garment, translates the analog image signal into a digital image signal and analyzes the digital image signal. The machine vision system 42 then sends this image to the system computer which compares the dimensions of this image to the dimensions of an ideal image for this size of garment stored in the computer and determines if this garment complies with the ideal image plus an allowable tolerance or deviation. If the dimensions of the garment 43 are within the allowable tolerance of the dimensions of the ideal image then the garment is moved from the inspection station 41 onto the exit conveyor 45 where it is carried away from the inspection station. If the dimensions of the garment are not within the allowable tolerance of the dimensions of the ideal image then the garment is taken off the inspection station and discarded in the reject bin 46.

The ideal image used in the two-dimensional measurement system to determine if the dimensions of the garment are correct is the same ideal image that was created from the idealized generic database as described above for the three-dimensional measurement system as illustrated in FIG. 3. The measurement is taken of the sample group using the three-dimensional system in block 21. In the block 22 an ideal pattern is made that will most nearly accommodate every member of the sample group. A sample piece of clothing is created using the ideal pattern in the block 23. In the block 24, the sample created in the block 23 is measured and inspected to insure that it matches the specified ideal pattern. If the sample created in the block 23 does match the specified pattern, then the standard measurement and pattern created in the blocks 21 and 22 are saved in the block 25.

In the block 26 a garment is manufactured according to the pattern made in the block 22. The manufactured garment is then measured in the block 27 using the two-dimensional measurement system of the present invention. The measurement of the manufactured garment taken in the block 27 is then compared to the standard measurement saved in the database in the block 28 to determine if the manufactured garment matches the ideal pattern plus an allowable tolerance. The decision is then made, based on this comparison, whether to send the garment down the line to be shipped or to discard the garment as irregular.

More than one machine vision system 42 can be used at each inspection station 41 to further enhance the accuracy of the measurements taken of the garment. Multiple machine vision systems can be coupled to the system computer 2, so that the system computer 2 can control multiple inspection stations 41.

While the present invention has been invented to specifically inspect and measure pieces of clothing, with very little adaptation it could be used in the manufacturing or inspection of any object that must comply with size requirements or where size is an important feature of the object. Various modifications may be made to the preferred embodiment without departing from the spirit and scope of the invention as defined by the appended claims.

We claim:

1. A method of developing a fit for a standard sized garment by generating and analyzing data on a plurality of persons within a size range, comprising the steps of:

a. capturing a plurality of analog image signals of a person without requiring the person wear a marked bodysuit, using a plurality of image capturing devices, each analog image signal from a different predetermined vantage point around an axis of rotation;

b. converting the plurality of analog image signals into a plurality of digital image signals for each person;

c. creating a three-dimensional representation of each person's body from the plurality of digital image signals for each person; and d. using a computer to compile the three dimensional representations from each of the plurality of people, for generating an ideal representation for the plurality of persons within the size range.

2. The method as claimed in claim 1 further comprising the step of rotating each person relative to the axis of rotation.

3. The method as claimed in claim 1 further comprising the step of rotating the plurality of image capturing devices relative to the axis of rotation.

4. The method as claimed in claim 1 further comprising the step of rotating both the plurality of image capturing devices and each person relative to each other and to the axis of rotation.

5. The method as claimed in claim 1 further comprising the step of positioning a plurality of mirrors, each at a different predetermined vantage point around the platform and then positioning a single image capturing device to capture a reflection of the person from each mirror in turn.

6. The method as claimed in claim 1 wherein the plurality of images of each person are captured by a plurality of CCD cameras which is arranged to capture a video image of the person at each predetermined vantage point and then send a signal representing the image from each predetermined vantage point to a computer which then combines the signals from each predetermined vantage point into a data map representing the dimensions of the person's body.

7. The method as claimed in claim 1 wherein the plurality of images of each person are captured by a laser imaging device which is arranged to capture an image of the person at each predetermined vantage point and then send a signal representing the image from each predetermined vantage point to a computer which then combines the signals from each predetermined vantage point into a data map representing the dimensions of the person's body.

8. The method as claimed in claim 1 wherein the method is used to create a three-dimensional representation for a single person in order to generate individualized or tailor-made clothing for that person.

9. The method as claimed in claim 8 wherein the three-dimensional representation for the single person is used to determine the sizes of pieces of clothing that can be worn by that person.

10. An apparatus for developing a fit for a standard sized garment by generating and analyzing data on a plurality of persons within a size range, comprising:

a. means for capturing a plurality of analog image signals of the person without requiring the person wear a marked bodysuit, each analog image signal from a different vantage point, around an axis of rotation;

b. a first means for converting the plurality of analog image signals into a plurality of digital image signals for each person, said first means for converting coupled to the means for capturing a plurality of analog images;

c. means for creating a three-dimensional representation of each person's body from the plurality of digital image signals for each person, said means for creating coupled to the first means for converting; and d. means for compiling the three-dimensional representations from each of the plurality of people to generate an ideal representation for the plurality of persons within the size range, said means for mathematically processing coupled to the means for creating a three-dimensional representation.

11. The apparatus as claimed in claim 10 wherein the apparatus is used to create a three-dimensional representation for a single person in order to generate individualized or tailor-made clothing for that person.

12. The apparatus as claimed in claim 11 wherein the three-dimensional representation for the single person is used to determine the sizes of pieces of clothing that can be worn by that person.

13. An apparatus for comparing an object of a specified size to determine if dimensions of that object are within a predetermined tolerance of a standard, comprising:

a. means for creating a representation of the object;

b. means for determining a plurality of dimensions of the object using the representation, said means for determining a plurality of dimensions coupled to the means for creating a representation;

c. means for storing a plurality of standards representative of an ideal object; and d. means for comparing the dimensions of the object to the standards for determining whether the dimensions of the object are within an allowable tolerance and wherein the representation can be either a two-dimensional representation or three-dimensional representation of the object, and wherein the three-dimensional representation of the object is created by fixing the object to a rotating platform and rotating the platform relative to an axis of rotation and capturing a plurality of images of the object, each image at a different vantage point, and wherein the rotating platform is equipped with a garment mount where a garment can be placed on the garment mount and blown up with compressed air so that the garment will assume its natural shape and the platform can then be rotated and an electronic representation of the garment can be captured.

14. The apparatus as claimed in claim 13 wherein the three-dimensional representation of the object is created by fixing the object to a platform and rotating a plurality of image capturing devices relative to the object and to an axis of rotation.

15. The apparatus as claimed in claim 13 wherein the three-dimensional representation of the object is created by fixing the object to a rotating platform and rotating the platform and a plurality of image capturing devices relative to each other and to an axis of rotation.

16. The apparatus as claimed in claim 13 wherein the three-dimensional representation of the object is created by fixing the object to a platform and positioning a plurality of mirrors around the platform, each mirror at a predetermined vantage point and positioning a single image capturing device to capture a reflection of the object from each mirror in turn.

17. A method of comparing an object of a specified size to a standard for an object of that specified size to determine if dimensions of that object are within a predetermined tolerance of the standard, comprising the steps of:

a. forming a representation of the object;

b. determining the dimensions of the object using the representation;

c. comparing the dimensions of the object to the standard for that object; and d. determining if the dimension of the object are within the standard plus a predetermined set of tolerances and wherein the representation can be either a two-dimensional or three-dimensional representation of the object, and wherein the three-dimensional representation of the object is formed by fixing the object to a rotating platform and rotating the object on a platform relative to an axis of rotation and capturing a plurality of images of the object, each image at a different vantage point, and wherein the platform is equipped with a garment mount where a garment can be placed on the garment mount and blown up with compressed air so that the garment will assume its natural shape and the platform can then be rotated and an electronic representation of the garment created.

18. The method as claimed in claim 17 wherein the representation is created by a plurality of CCD cameras which are arranged to capture a video image of the object and then send a signal representing the image to a computer.

19. The method as claimed in claim 17 wherein the representation is created by a laser imaging device which is arranged to capture an image of the object, and then send a signal representing that image to a computer.

20. A method of measuring a plurality of dimensions of an object and comparing those measured dimensions to a predetermined pattern, comprising the steps of:

a. creating an analog image signal of the object;

b. converting the analog image signal into a digital image signal;

c. comparing the digital image signal to the predetermined pattern; and d. determining if the digital image signal matches the predetermined pattern within a preprogrammed set of tolerances and wherein the analog image signal can be either a two-dimensional representation or a three-dimensional representation of the object, and wherein the three-dimensional representation of the object is created by fixing the object to a rotating platform and rotating the platform relative to an axis of rotation and capturing a plurality of images, each image at a different vantage point, and wherein the platform is equipped with a garment mount where a garment can be placed on the garment mount and blown up with compressed air so that the garment will assume its natural shape and the platform can then be rotated and an analog image signal of the object created.

21. An apparatus for comparing an object of a specified size to determine if dimensions of that object are within a predetermined tolerance of a standard, comprising:

a. means for creating a representation of the object;

b. means for determining a plurality of dimensions of the object using the representation, said means for determining a plurality of dimensions coupled to the means for creating a representation;

c. means for storing a plurality of standards representative of an ideal object; and d. means for comparing the dimensions of the object to the standards for determining whether the dimensions of the object are within an allowable tolerance, wherein the representation can be either a two-dimensional representation or three-dimensional representation of the object, and wherein the three-dimensional representation of the object is created by fixing the object to a platform and rotating a plurality of image capturing devices relative to the object and to an axis of rotation, and wherein the platform is equipped with a garment mount where a garment can be placed on the garment mount and blown up with compressed air so that the garment will assume its natural shape.

* * * * *